(12) United States Patent
Ouhadi

(10) Patent No.: US 7,964,672 B2
(45) Date of Patent: *Jun. 21, 2011

(54) HIGH STRENGTH THERMOPLASTIC ELASTOMERS WITH HIGH FILLER LOADING

(75) Inventor: Trazollah Ouhadi, Liege (BE)

(73) Assignee: ExxonMobil Chemical Patents Inc., Houston, TX (US)

( * ) Notice: Subject to any disclaimer, the term of this patent is extended or adjusted under 35 U.S.C. 154(b) by 138 days.

This patent is subject to a terminal disclaimer.

(21) Appl. No.: 10/982,194

(22) Filed: Nov. 5, 2004

(65) Prior Publication Data

US 2006/0100377 A1    May 11, 2006

(51) Int. Cl.
C08L 23/00 (2006.01)
C08K 3/00 (2006.01)
(52) U.S. Cl. ......... 525/240; 524/401; 524/413; 525/191
(58) Field of Classification Search ............... 525/240, 525/191; 524/401, 413
See application file for complete search history.

(56) References Cited

U.S. PATENT DOCUMENTS

| | | | |
|---|---|---|---|
| 5,349,005 A | 9/1994 | Tanaka | |
| 6,245,856 B1 | 6/2001 | Kaufman | |
| 6,277,916 B1 * | 8/2001 | Terbrueggen et al. | 525/95 |
| 6,288,171 B2 | 9/2001 | Finerman | |
| 6,342,565 B1 | 1/2002 | Cheng | |
| 6,407,174 B1 | 6/2002 | Ouhadi | |
| 6,414,070 B1 * | 7/2002 | Kausch et al. | 524/445 |
| 6,525,157 B2 | 2/2003 | Cozewith | |
| 6,642,316 B1 | 11/2003 | Datta | |
| 6,713,520 B2 | 3/2004 | Sahnoune | |
| 7,125,924 B2 | 10/2006 | Credali et al. | |
| 7,438,748 B2 * | 10/2008 | Cogen et al. | 106/18.11 |
| 2002/0099141 A1 * | 7/2002 | Sato et al. | 525/192 |
| 2003/0013820 A1 * | 1/2003 | Yamanaka | 525/387 |
| 2004/0033741 A1 * | 2/2004 | Peng | 442/38 |

FOREIGN PATENT DOCUMENTS

| | | |
|---|---|---|
| EP | 0 754 726 | 1/1997 |
| WO | WO 00/69965 | * 11/2000 |
| WO | WO 02/051634 A1 | 7/2002 |
| WO | WO 03/051982 | 6/2003 |

OTHER PUBLICATIONS

Exxelor PO 1015, pp. 1-2, May 2003.*
U.S. Appl. No. 11/282,906, filed May 2007, Trazollah Ouhadi.*
Wagner, M. P., "Part II Nonblack Fillers," in Morton, M., *Rubber Technology* 3rd Ed. (New York, Van Nostrand Reinhold, 1987), pp. 86-104. ISBN 0-442-26422-4.
Evans, Larry R. *Introduction to mineral fillers for rubber* Rubber World, (Apr. 1, 2001), pp. 1-7. ISSN: 0035-9572.

* cited by examiner

Primary Examiner — Milton I Cano
Assistant Examiner — Gennadiy Mesh
(74) Attorney, Agent, or Firm — Kevin M. Faulkner

(57) ABSTRACT

A high strength thermoplastic vulcanizate (TPV) composition is provided. The TPV includes a dispersed rubber component, a polyolefinic thermoplastic resin component, a propylene copolymer and mineral filler present in the amount of 20 wt % to 70 wt % based on total of the thermoplastic vulcanizate composition. Preferably, the propylene copolymer has 60 wt % or more units derived from propylene; includes isotactically arranged propylene derived sequences; and has a heat of fusion less than 45 J/g. Preferably, the mineral filler is halogen free and flame retardant. The high strength TPV can be useful for making a variety of articles for electrical, construction, automotive, and consumer applications, including fuel cell.

17 Claims, No Drawings

HIGH STRENGTH THERMOPLASTIC ELASTOMERS WITH HIGH FILLER LOADING

BACKGROUND

1. Field of Invention

Embodiments described generally relate to thermoplastic elastomers and articles made therefrom.

2. Description of Related Art

One type of thermoplastic elastomer is a thermoplastic vulcanizate (TPV). A TPV can be characterized by finely divided rubber particles dispersed within a plastic matrix. These rubber particles are crosslinked to promote elasticity. As such, TPVs exhibit the processing properties of the plastic and the elasticity of the rubber.

TPVs are conventionally produced by dynamic vulcanization. Dynamic vulcanization is a process whereby a rubber component is crosslinked or vulcanized within a blend of at least one non-vulcanizing polymer component while undergoing mixing or masticating at some elevated temperature. Preferably, the temperature of this curing step is greater than the melt temperature of the non-vulcanizing polymer component.

TPVs are used to form a variety of articles and composites for automotive, construction, consumer, manufacturing, and other industrial markets. Some of those uses require some degree of a filler type material for flame retardancy, sound deadening, thermal insulation, or electrical insulation, for example. However, such TPVs having the necessary loading of filler material for a particular use suffer significantly from the degradation of its mechanical properties like tensile strength and elongation at break due to the presence of the filler material. There is a need, therefore, for TPVs that contain high levels of filler material and that retain all the elasticity of the rubber phase and all the processing properties of the plastic phase.

SUMMARY

A high strength thermoplastic vulcanizate (TPV) composition is provided. In one or more embodiments, the TPV includes a dispersed rubber component, a polyolefinic thermoplastic resin component, a propylene copolymer and mineral filler. The mineral filler is present in the amount of from 20 wt % to 70 wt % based on total of the thermoplastic vulcanizate composition. The propylene copolymer has 60 wt % or more units derived from propylene; includes isotactically arranged propylene derived sequences; and has a heat of fusion less than 45 J/g.

In one or more embodiments, the polyolefinic thermoplastic resin component is present in the amount of from 1 wt % to 30 wt % based on total weight of the thermoplastic vulcanizate composition. In one or more embodiments, the polyolefinic thermoplastic resin component includes a polypropylene homopolymer, isotactic polypropylene, an impact copolymer comprising polypropylene, or blends thereof.

An article comprising a roofing material prepared from the TPV composition is also provided. Further, an article comprising a sound deadening material prepared from the TPV composition is provided.

Also provided is the use of from 20 wt % to 70 wt % based on total of the composition, one or more mineral fillers in a thermoplastic vulcanizate composition comprising a dispersed rubber component, a polyolefinic thermoplastic resin component, and a propylene copolymer that has 60 wt % or more units derived from propylene; includes isotactically arranged propylene derived sequences; and has a heat of fusion less than 45 J/g for the purpose of improving flame retardancy and processability.

DETAILED DESCRIPTION

The term "thermoplastic vulcanizate composition" (also referred to as simply thermoplastic vulcanizate or TPV) is broadly defined as any material that includes a dispersed, at least partially vulcanized, rubber component; a thermoplastic resin component; and an additive oil. A TPV material can further include other ingredients, other additives, or both.

The term "vulcanizate" means a composition that includes some component (e.g., rubber component) that has been vulcanized. The term "vulcanized" is defined herein in its broadest sense, as reflected in any issued patent, printed publication, or dictionary, and refers in general to the state of a composition after all or a portion of the composition (e.g., crosslinkable rubber) has been subjected to some degree or amount of vulcanization. Accordingly, the term encompasses both partial and total vulcanization. A preferred type of vulcanization is "dynamic vulcanization," discussed below, which also produces a "vulcanizate." Also, in at least one specific embodiment, the term vulcanized refers to more than insubstantial vulcanization, e.g., curing (crosslinking) that results in a measurable change in pertinent properties, e.g., a change in the melt flow index (MFI) of the composition by 10% or more (according to any ASTM-1238 procedure). In at least that context, the term vulcanization encompasses any form of curing (crosslinking), both thermal and chemical, that can be utilized in dynamic vulcanization.

The term "dynamic vulcanization" means vulcanization or curing of a curable rubber blended with a thermoplastic resin under conditions of shear at temperatures sufficient to plasticize the mixture. In at least one embodiment, the rubber is simultaneously crosslinked and dispersed as micro-sized particles within the thermoplastic resin component. Depending on the degree of cure, the rubber to thermoplastic resin component ratio, compatibility of the rubber and thermoplastic resin component, the kneader type and the intensity of mixing (shear rate), other morphologies, such as co-continuous rubber phases in the plastic matrix, are possible.

As the term is used herein, a "partially vulcanized" rubber is one wherein more than 5 weight percent (wt %) of the crosslinkable rubber is extractable in boiling xylene, subsequent to vulcanization (preferably dynamic vulcanization), e.g., crosslinking of the rubber phase of the thermoplastic vulcanizate. For example, at least 5 wt % and less than 20 wt % or 30 wt % or 50 wt % of the crosslinkable rubber can be extractable from the specimen of the thermoplastic vulcanizate in boiling xylene. The percentage of extractable rubber can be determined by the technique set forth in U.S. Pat. No. 4,311,628, and the portions of that patent referring to that technique are hereby incorporated by reference.

Preferably, the percent of soluble rubber in the cured composition is determined by refluxing a specimen in boiling xylene, weighing the dried residue and making suitable corrections for soluble and insoluble components based upon knowledge of the composition. Thus, corrected initial and final weights are obtained by subtracting from the initial weight the weight of the soluble components, other than the rubber to be vulcanized, such as extender oils, plasticizers and components of the compositions soluble in organic solvent, as well as that rubber component that it is not intended to cure. Any insoluble pigments, fillers, etc., are subtracted from both the initial and final weights. Any materials in the uncured rubber that are soluble in refluxing xylene are subtracted from the rubber when calculating the percent of soluble rubber in a cured composition, up to about 5 weight percent, typically between about 0.5 to about 2.0 weight percent, of EPDM rubber is soluble in refluxing xylene.

A "fully vulcanized" (or fully cured or fully crosslinked) rubber is one wherein less than 5 weight percent (wt %) of the crosslinkable rubber is extractable in boiling xylene subsequent to vulcanization (preferably dynamic vulcanization), e.g., crosslinking of the rubber phase of the thermoplastic vulcanizate. Preferably, 4 wt % or less, or 3 wt % or less, or 2 wt % or less, or 1 wt % or less of the crosslinkable rubber is extractable in boiling xylene.

Rubber Component

The "rubber component" can be any material that is considered by persons skilled in the art to be a "rubber," preferably a crosslinkable rubber (e.g., prior to vulcanization) or crosslinked rubber (e.g., after vulcanization). For example, the rubber component can be any olefin-containing rubber such as ethylene-propylene copolymers (EPM), including particularly saturated compounds that can be vulcanized using free radical generators such as organic peroxides, as noted in U.S. Pat. No. 5,177,147. Other rubber components can include ethylene-propylene-diene (EPDM) rubber, or EPDM-type rubber, for example. An EPDM-type rubber can be a terpolymer derived from the polymerization of at least two different monoolefin monomers having from 2 to 10 carbon atoms, preferably 2 to 4 carbon atoms, and at least one poly-unsaturated olefin having from 5 to 20 carbon atoms.

The rubber component can also be a butyl rubber. The term "butyl rubber" includes a polymer that predominantly includes repeat units from isobutylene but also includes a few repeat units of a monomer that provides a site for crosslinking. Monomers providing sites for crosslinking include a polyunsaturated monomer such as a conjugated diene or divinyl benzene. In one or more embodiments, the butyl rubber polymer can be halogenated to further enhance reactivity in crosslinking. Those polymers are referred to as "halobutyl rubbers."

Further, the rubber component can be homopolymers of conjugated dienes having from 4 to 8 carbon atoms and rubber copolymers having at least 50 weight percent repeat units from at least one conjugated diene having from 4 to 8 carbon atoms. The rubber component can also be synthetic rubber, which can be nonpolar or polar depending on the comonomers. Examples of synthetic rubbers include synthetic polyisoprene, polybutadiene rubber, styrene-butadiene rubber, butadiene-acrylonitrile rubber, etc. Amine-functionalized, carboxy-functionalized or epoxy-functionalized synthetic rubbers can also be used. Examples of those include maleated EPDM, and epoxy-functionalized natural rubbers.

A list of preferred rubber components include, but are not limited to, ethylene-propylene-diene rubber, natural rubber, butyl rubber, halobutyl rubber, halogenated rubber copolymer of p-alkystyrene and at least one isomonoolefin having 4 to 7 carbon atoms, a copolymer of isobutylene and divinylbenzene, a rubber homopolymer of a conjugated diene having from 4 to 8 carbon atoms, a rubber copolymer having at least 50 weight percent repeat units from at least one conjugated diene having from 4 to 8 carbon atoms and a vinyl aromatic monomer having from 8 to 12 carbon atoms, or acrylonitrile monomer, or an alkyl substituted acrylonitrile monomer having from 3 to 8 carbon atoms, or an unsaturated carboxylic acid monomer, or an unsaturated anhydride of a dicarboxylic acid, or combinations thereon.

Polyolefinic Thermoplastic Resin Component

The polyolefinic thermoplastic resin can be any material that is not a "rubber" and that is a polymer or polymer blend considered by persons skilled in the art as being thermoplastic in nature, e.g., a polymer that softens when exposed to heat and returns to its original condition when cooled to room temperature. The polyolefinic thermoplastic resin component can contain one or more polyolefins, including polyolefin homopolymers and polyolefin copolymers. Except as stated otherwise, the term "copolymer" means a polymer derived from two or more monomers (including terpolymers, tetrapolymers, etc.), and the term "polymer" refers to any carbon-containing compound having repeat units from one or more different monomers.

Illustrative polyolefins can be prepared from mono-olefin monomers including, but are not limited to, monomers having 2 to 7 carbon atoms, such as ethylene, propylene, 1-butene, isobutylene, 1-pentene, 1-hexene, 1-octene, 3-methyl-1-pentene, 4-methyl-1-pentene, 5-methyl-1-hexene, mixtures thereof and copolymers thereof with (meth)acrylates and/or vinyl acetates. Preferably, the polyolefinic thermoplastic resin component is unvulcanized or non cross-linked.

In one or more embodiments, the polyolefinic thermoplastic resin component contains polypropylene. The term "polypropylene" as used herein broadly means any polymer that is considered a "polypropylene" by persons skilled in the art (as reflected in at least one patent or publication), and includes homo, impact, and random polymers of propylene. Preferably, the polypropylene used in the compositions described herein has a melting point above 110° C., includes at least 90 wt % propylene units, and contains isotactic sequences of those units. The polypropylene can also include atactic sequences or syndiotactic sequences, or both. The polypropylene can also include essentially syndiotactic sequences such that the melting point of the polypropylene is above 110° C. The polypropylene can either derive exclusively from propylene monomers (i.e., having only propylene units) or derive from mainly propylene (more than 80% propylene) with the remainder derived from olefins, particularly ethylene, and/or $C_4$-$C_{10}$ α-olefins. As noted elsewhere herein, certain polypropylenes have a high MFI (e.g., from a low of 10, or 15, or 20 g/10 min to a high of 25 to 30 g/10 min. Others have a lower MFI, e.g., "fractional" polypropylenes which have an MFI less than 1.0. Those with high MFI can be preferred for ease of processing or compounding.

In one or more embodiments, the polyolefinic thermoplastic resin component is or includes isotactic polypropylene. Preferably, the polyolefinic thermoplastic resin component contains one or more crystalline propylene homopolymers or copolymers of propylene having a melting temperature greater than 105° C. as measured by DSC. Preferred copolymers of propylene include, but are not limited to, terpolymers of propylene, impact copolymers of propylene, random polypropylene and mixtures thereof. Preferred comonomers have 2 carbon atoms, or from 4 to 12 carbon atoms. Preferably, the comonomer is ethylene. Such polyolefinic thermoplastic resin components and methods for making the same are described in U.S. Pat. No. 6,342,565.

The term "random polypropylene" as used herein broadly means a single phase copolymer of propylene having up to 9 wt %, preferably 2 wt % to 8 wt % of an alpha olefin comonomer. Preferred alpha olefin comonomers have 2 carbon atoms, or from 4 to 12 carbon atoms. Preferably, the alpha olefin comonomer is ethylene.

Thermoplastic Modifier

In one or more embodiments, the TPV can include up to about 10 wt % or more based on total polymeric content of one or more thermoplastic modifiers to adjust the mechanical properties of the TPV. Illustrative thermoplastic modifiers include, but are not limited to un-crosslinked ethylene-propylene rubber, very low density and linear low polyethylene copolymers, styrenic block copolymers, and semi-crystalline propylene homopolymers or random copolymers having from about 1-20 wt % of ethylene or alpha-olefins containing 4-8 carbon atoms. Illustrative styrenic block copolymer include, but are not limited to, styrene-olefin-styrene triblock copolymers such as styrene-butadiene-styrene (S-B-S), styrene-ethylene/butylene-styrene (S-EB-S), styrene-ethylene/propylene-styrene (S-EP-S), styrene-isoprene-styrene (S-I-S), hydrogenated polystyrene-isoprene/butadiene-styrene (S-IB-S), derivatives thereof, and blends thereof.

In one or more embodiments, the one or more thermoplastic modifiers are functionalized with from about 0.2 to about 5 wt % polar moieties, such as carboxy-acids/anhydrides, amino, and epoxy moieties, for example. Commercially useful modifiers include ExxonMobil Chemical Company products Exxelor PO 1015 (polypropylene functionalized with 0.25 to 0.5 wt. % maleic anhydride) and Exxelor VA 1840 (ethylene copolymer functionalized with 0.25 to 0.5 wt. % maleic anhydride). Other examples include Kraton Polymers product KRATON FG1901X (styrene-ethylene-butene-styrene copolymer functionalized with 1.7 to 2.0 wt % maleic anhydride).

Additive Oil

The term "additive oil" includes both "process oils" and "extender oils." For example, "additive oil" can include hydrocarbon oils and plasticizers, such as organic esters and synthetic plasticizers. Many additive oils are derived from petroleum fractions, and have particular ASTM designations depending on whether they fall into the class of paraffinic, naphthenic, or aromatic oils. Other types of additive oils include alpha olefinic synthetic oils, such as liquid polybutylene, e.g., products sold under the trademark Parapol®. Additive oils other than petroleum based oils can also be used, such as oils derived from coal tar and pine tar, as well as synthetic oils, e.g., polyolefin materials (e.g., SpectraSyn™, supplied by ExxonMobil Petroleum & Chemical). Certain rubber components (e.g., EPDMs, such as Vistalon 3666) include additive oil that is preblended before the rubber component is combined with the thermoplastic. The type of additive oil utilized will be that customarily used in conjunction with a particular rubber component.

The ordinarily skilled chemist will recognize which type of oil should be used with a particular rubber, and also be able to determine the amount (quantity) of oil. The additive oil can be present in amounts from about 5 to about 300 parts by weight per 100 parts by weight of the blend of the rubber and isotactic polypropylene components. The amount of additive oil can also be expressed as from about 30 to 250 parts, and more desirably from about 70 to 200 parts by weight per 100 parts by weight of the rubber component. Alternatively, the quantity of additive oil can be based on the total rubber content, and defined as the ratio, by weight, of additive oil to total rubber and that amount can in certain cases be the combined amount of process oil (typically added during manufacturing of TPV before and/or after curing the rubber) and extender oil (typically added in the rubber during its manufacturing). The ratio can range, for example, from about 0 to about 4.0/1. Other ranges, having any of the following lower and upper limits, can also be utilized: a lower limit of 0.1/1, or 0.6/1, or 0.8/1, or 1.0/1, or 1.2/1, or 1.5/1, or 1.8/1, or 2.0/1, or 2.5/1; and an upper limit (which can be combined with any of the foregoing lower limits) of 4.0/1, or 3.8/1, or 3.5/1, or 3.2/1, or 3.0/1, or 2.8/1. Larger amounts of additive oil can be used, although the deficit is often reduced physical strength of the composition, or oil weeping, or both.

Rubber Curing Agent

Any curative that is capable of curing or crosslinking the rubber component can be used. Illustrative curatives include, but are not limited to, phenolic resins, peroxides, maleimides, and silicon-containing curatives. Depending on the rubber employed, certain curatives can be preferred. For example, where elastomeric copolymers containing units deriving from vinyl norbornene are employed, a peroxide curative can be preferred because the required quantity of peroxide will not have a deleterious impact on the engineering properties of the thermoplastic phase of the thermoplastic vulcanizate. In other situations, however, it can be preferred not to employ peroxide curatives because they can, at certain levels, degrade the thermoplastic components of the thermoplastic vulcanizate.

A preferred curative contains one or more phenolic resins. Phenolic resins are described in U.S. Pat. Nos. 2,972,600; 3,287,440; and 6,433,090. The preferred phenolic resin curatives can be referred to as resole resins and are made by condensation of alkyl substituted phenols or unsubstituted phenols with aldehydes, preferably formaldehydes, in an alkaline medium or by condensation of bi-functional phenoldialcohols. The alkyl substituents of the alkyl substituted phenols typically contain 1 to about 10 carbon atoms. Dimethylol phenols or phenolic resins, substituted in para-positions with alkyl groups containing 1 to about 10 carbon atoms are preferred. These phenolic curatives are typically thermosetting resins and can be referred to as phenolic resin curatives or phenolic resins. These phenolic resins are ideally used in conjunction with a catalyst system. For example, non-halogenated phenol curing resins are preferably used in conjunction with halogen donors and, optionally, a hydrogen halide scavenger. Where the phenolic curing resin is halogenated, a halogen donor is not required but the use of a hydrogen halide scavenger, such as ZnO, is preferred. For a further discussion of phenolic resin curing of thermoplastic vulcanizates, reference can be made to U.S. Pat. No. 4,311,628.

Useful silicon-containing curatives generally include silicon hydride compounds having at least two SiH groups. These compounds react with carbon-carbon double bonds of unsaturated polymers in the presence of a hydrosilylation catalyst. Silicon hydride compounds that are useful in practicing the present invention include, but are not limited to, methylhydrogen polysiloxanes, methylhydrogen dimethylsiloxane copolymers, alkyl methyl polysiloxanes, bis(dimethylsilyl)alkanes, bis(dimethylsilyl)benzene, and mixtures thereof.

Peroxide curatives are generally selected from organic peroxides. Examples of organic peroxides include, but are not limited to, di-tert-butyl peroxide, dicumyl peroxide, t-butyl-cumyl peroxide, alpha,alpha-bis(tert-butylperoxy)diisopropyl benzene, 2,5 dimethyl 2,5-di(t-butylperoxy)hexane, 1,1-di(t-butylperoxy)-3,3,5-trimethyl cyclohexane, -butyl-4,4-bis(tert-butylperoxy)valerate, benzoyl peroxide, lauroyl peroxide, dilauroyl peroxide, 2,5-dimethyl-2,5-di(tert-butylperoxy)hexene-3, and mixtures thereof. Also, diaryl peroxides, ketone peroxides, peroxydicarbonates, peroxyesters, dialkyl peroxides, hydroperoxides, peroxyketals and mixtures thereof can be used. For a further discussion of peroxide curatives and their use for preparing thermoplastic vulcanizates, reference can be made to U.S. Pat. No. 5,656,693.

Mineral Filler

In specific embodiments, the TPV compositions include one or more mineral fillers. The mineral fillers can be halogen free, flame retardant, electrically conductive, capable of deadening sound, or any combination thereof. Illustrative mineral fillers are listed below. The following lists are intended to be illustrative only, and any of the following mineral fillers can be used alone or in combination with one or more fillers from its same list or from any of the other lists.

Examples of suitable halogen free mineral fillers include, but are not limited to, aluminum trihydroxide, magnesium dihydroxide, ammonium phosphate, diammonium hydrogen phosphate, polyammonium phosphate, and tribromoneopentyl esters of phosphoric acids.

Examples of fire-retardant fillers include, but are not limited to, halogenated fire-retardant agents such as chlorinated biphenyl and halogenated cyctopentadieno used conjointly with metal oxides such as antimony oxide, halogenated polymers; mixtures of halogen and phosphorus fire-retardants such as the condensation products of amines with tris-(2,3-dibromopropyl)-phosphate, mixtures of 2,3 dibromopropanol and tris-(2,3-dibromopropyl) phosphates, condensation products of bis-(carboxyethyl) phosphine oxide with halomethyl benzene; mixtures of carboxylic acid metal salts and beta-haloethylphosphate; and inorganic fire-retardants such as halogen-containing antimony oxide sols and salts of Sb(v) esters.

Examples of sound deadening mineral fillers include, but are not limited to, magnesium sulfate, calcium sulfate, barium sulfate, aluminum sulfate, aluminum ammonium sulfate, aluminum potassium sulfate, aluminum sodium sulfate, magnesium carbonate, calcium carbonate, calcinated clay, calcium borate, talcum, mica, zinc borates, and aluminum phosphate. Additional examples include talc, carbon black or graphite, calcium carbonate, flyash, cement dust, clay, feldspar, nepheline, silica or glass, fumed silica, alumina, magnesium oxide, zinc oxide, barium sulfate, aluminum silicate, calcium silicate, titanium dioxide, titanates, glass microspheres, chalk, wood fibers, wood chips, ground rice hulls, cotton, starch, glass fibers, synthetic fibers (e.g., polyolefin fibers), and carbon fibers.

Electrically conductive mineral fillers include, but are not limited to, graphite powder, metallic powders, carbon fibers, and metallic fibers, for example. Illustrative electrically conductive mineral fillers also include metal-containing compositions having metals selected from aluminum, copper, gold, nickel, silver, steel, tungsten, zinc, and other similar materials. Illustrative electrically conductive mineral fillers further include metal alloys such as brass, tin and stainless steel, and metal coated particulates such as nickel and silver coated glass fibers and spheres. Additional illustrative, electrically conductive fillers are listed in U.S. Pat. No. 5,707,699.

In one or more embodiments, the thermoplastic elastomer composition includes more than 30% by weight, more than 40 wt %, more than 50 wt %, more than 60 wt %, or more than 70 wt % of the one or more mineral fillers, based on total weight of the thermoplastic elastomer composition. In one or more embodiments, the amount of the mineral filler within the thermoplastic elastomer composition ranges from a low of 20 wt %, or 25 wt %, or 30 wt % to a high of 50 wt %, or 60 wt %, or 70 wt %. Preferably, the thermoplastic elastomer composition includes up to 70 wt % of the mineral filler, based on total weight of the thermoplastic elastomer composition. More preferably, the thermoplastic elastomer composition includes of from 20 wt % to about 70 wt % of the mineral filler, based on total weight of the thermoplastic elastomer composition.

Other Additives

The term "other additives" can include, but is not limited to, lubricants, antioxidants, antiblocking agents, stabilizers, anti-degradants, anti-static agents, waxes, foaming agents, pigments, processing aids, adhesives, tackifiers, plasticizers, wax, and discontinuous fibers (such as world cellulose fibers). Illustrative particulate fillers include, but are not limited to carbon black, silica, titanium dioxide, calcium carbonate, colored pigments, clay, and combinations thereof. When non-black fillers are used, it can be desirable to include a coupling agent to compatibilize the interface between the non-black fillers and polymers. Desirable amounts of carbon black, or other colorants, when present, are from about 5 to about 250 parts by weight per 100 parts by weight of rubber.

Propylene Copolymer

In one or more embodiments, the thermoplastic modifier includes a "propylene copolymer." A "propylene copolymer" includes at least two different types of monomer units, one of which is propylene. Suitable monomer units include, but are not limited to, ethylene and higher α-olefins ranging from $C_4$ to $C_{20}$, such as, for example, 1-butene, 4-methyl-1-pentene, 1-hexene or 1-octene and 1-decene, or mixtures thereof, for example. Preferably, ethylene is copolymerized with propylene, so that the propylene copolymer includes propylene units (units on the polymer chain derived from propylene monomers) and ethylene units (units on the polymer chain derived from ethylene monomers).

In one or more embodiments, the propylene copolymer contains at least 75 wt % of propylene-derived units. In one or more embodiments, the propylene copolymer contains from 75 wt % to 95 wt % of propylene-derived units. In one or more embodiments, the propylene copolymer contains from 80 wt % to 90 wt % of propylene-derived units. In one or more embodiments, the propylene copolymer can consist essentially of from 80 to 95 wt % repeat units from propylene and from 5 to 20 wt % of repeat units from one or more unsaturated olefin monomers having 2 or 4 to 12 carbon atoms.

Preferably, the propylene copolymer has crystalline regions interrupted by non-crystalline regions. The non-crystalline regions can result from regions of non-crystallizable polypropylene segments, the inclusion of comonomer units, or both. In one or more embodiments, the propylene copolymer has a propylene-derived crystallinity that is isotactic, syndiotactic, or a combination thereof. In a preferred embodiment, the propylene copolymer has isotactic sequences. The presence of isotactic sequences can be determined by NMR measurements showing two or more propylene derived units arranged isotactically. Such isotactic sequences can, in some cases be interrupted by propylene units that are not isotactically arranged or by other monomers that otherwise disturb the crystallinity derived from the isotactic sequences.

In one or more embodiments, the propylene-derived units of the propylene copolymer have an isotactic triad fraction of about 65% to about 99%. In one or more embodiments, the propylene-derived units of the propylene copolymer have an isotactic triad fraction of about 70% to about 98%. In one or more embodiments, the propylene-derived units of the propylene copolymer have an isotactic triad fraction of about 75% to about 97%.

Due to the introduction of errors in the insertion of propylene and/or by the presence of comonomer, the crystallinity and the melting point of the propylene copolymer are reduced compared to highly isotactic polypropylene. For example, the propylene-derived crystallinity of the propylene copolymer can range from about 2% to about 65% in one embodiment and from about 5% to about 40% in another embodiment as measured by Differential Scanning Calorimetry (DSC).

The crystallinity of the propylene copolymer can also be expressed in terms of "heat of fusion," measured using a Differential Scanning Calorimetry (DSC) test, most preferably in accordance with ASTM E-794-95. Preferably, about 6 mg to about 10 mg of a sheet of the polymer to be tested is pressed at approximately 200° C. to 230° C., then removed with a punch die and annealed at room temperature for 48 hours. At the end of that period, the sample is placed in a Differential Scanning Calorimeter (Perkin Elmer 7 Series Thermal Analysis System) and cooled to about −50° C. to −70° C. The sample is heated at about 10° C./min to attain a final temperature of about 180° C. to about 200° C. The thermal output is recorded as the area under the melting peak(s) of the sample, which is typically at a maximum peak at about 30° C. to about 175° C. and occurs between the temperatures of about 0° C. and about 200° C. The thermal output is measured in Joules as a measure of the heat of fusion.

The propylene copolymer can have a heat of fusion ranging broadly from 1.0 J/g to 90 J/g; or more narrowly from 2 J/g to 40 J/g; or from 5 J/g to 35 J/g; or from 7 J/g to 25 J/g. In one or more specific embodiments, the propylene copolymer has a heat of fusion of 75 J/g or less, or 50 J/g or less, or 35 J/g or less. Preferably, the propylene copolymer has a heat of fusion less than 45 J/g.

The "melting point" can be measured using the DSC test described above. Using the DSC test, the melting point is the temperature recorded corresponding to the greatest heat absorption within the range of melting temperature of the sample. When a single melting peak is observed, that peak is deemed to be the "melting point." When multiple peaks are observed (e.g., principal and secondary peaks), then the melting point is deemed to be the highest of those peaks. It is noted that at the low-crystallinity end at which elastomers are commonly found, the melting point peak can be at a low temperature and be relatively flat, making it difficult to determine the precise peak location. Furthermore, as with the DSC method, the peak location can be influenced by annealing and relaxation treatments. Therefore, it is recommended that the sample pretreatment procedure stated above for the DSC be followed.

The propylene copolymer can have any one of the following melting points, ranging from a lower limit of 25° C., or 30° C., or 35° C., or 40° C., or 45° C., or 50° C., to a higher limit of 105° C., or 100° C., or 95° C., or 90° C., or 85° C., or 80° C., or 75° C., or 70° C. In other specific embodiments, the melting point of the propylene copolymer can be expressed as any one of a selection of ranges, e.g., ranges of from 30° C. to 70° C. or from 40° C. to 50° C.

The crystallinity interruption described above can be predominantly controlled by the incorporation of the non-propylene monomer units. Accordingly, the comonomer content of the propylene copolymer can range from about 5 wt % to about 30 wt % in one embodiment and from about 8 wt % to about 30 wt % in another embodiment and from about 8 wt % to about 15 wt % in still another embodiment. In one or more of the compositions described herein, the propylene copolymer can have a comonomer content of greater than 8 wt %; or greater than 10 wt %; or greater than 12 wt %; or greater than 15 wt %.

Furthermore, the propylene-derived crystallinity of the propylene copolymer can be selected to ensure the desired compatibility with the other ingredients of the TPV composition, e.g., with the other polymers in the thermoplastic resin component, as well as with the rubber component and additives. In a preferred aspect, the propylene-derived crystallinity is selected relative to any polypropylene resin present in the thermoplastic resin component. In some embodiments, the tacticity of the propylene copolymer and the tacticity of the thermoplastic resin component (which can include two or more different polypropylene polymers) can be the same or substantially the same. By "substantially" it is meant that these two components have at least 80% of the same tacticity.

In another embodiment, the components have at least 90% of the same tacticity. In still another embodiment, the components have at least 100% of the same tacticity. Even if the components are of mixed tacticity, e.g., being partially isotactic and partially syndiotactic, the percentages in each should be at least about 80% the same as the other component in at least one or more embodiments.

In one or more embodiments, the propylene copolymer is made using random polymerization methods, including those described in U.S. Pat. Nos. 6,288,171; 6,525,157; 5,001,205; WO 96/33227; WO 97/22639; 4,543,399; 4,588,790; 5,028,670; 5,317,036; 5,352,749; 5,405,922; 5,436,304; 5,453,471; 5,462,999; 5,616,661; 5,627,242; 5,665,818; 5,668,228; 5,677,375; 5,693,727; 3,248,179; 4,613,484; 5,712,352; EP-A-0 794 200; EP-A-0 802 202; and EP-B-634 421. However, the propylene copolymer is not limited by any particular polymerization method. Suitable polymerization methods include gas phase, slurry, and solution, for example.

The propylene copolymer is also not limited by any or any particular type of reaction vessel. The propylene copolymer can in certain embodiments be formed in a single reactor. The propylene copolymer can in certain embodiments be formed in one or more series reactors (e.g., two or more reactors arranged in series). The propylene copolymer can in certain embodiments be formed in a batch reactor. Preferably, the continuous polymerization methods have sufficient backmixing such that there are no concentration gradients within the reactor. Preferably, the propylene copolymer is formed using solution polymerization (as opposed to slurry or gas-phase polymerization) such that the catalyst system exists in a single-phase environment.

The propylene copolymer is not limited by any particular catalyst or catalyst system. In one or more embodiments, the catalyst system can include one or more transition metal compounds and one or more activators. Multiple activators can be used, including using mixtures of alumoxanes or aluminum alkyls with ionizing activators. When alumoxane or aluminum alkyl activators are used, the combined pre-catalyst-to-activator molar ratio is from 1:5000 to 10:1. When ionizing activators are used, the combined pre-catalyst-to-activator molar ratio is from 10:1 to 1:10. In one or more embodiments, the one or more catalyst systems disclosed in U.S. Patent Application 20040024146 published Feb. 5, 2004, can be used. In one or more embodiments, nonmetallocene, metal-centered, heteroaryl ligand catalyst systems as described in U.S. Patent Application 20030204017 published Oct. 30, 2003, can be used.

Preferably, the propylene copolymer is made in the presence of a metallocene catalyst system. As a nonlimiting example, illustrative metallocene catalyst systems can include, but are not limited to, a bis-indenyl compound, particularly a bridged bis-indenyl compound, and even more particularly a bridged bis-indenyl compound without any 2-substitutions. Alternatively, however, in one or more specific embodiments, any propylene copolymer used in an elastomeric structure can be prepared using a single site catalyst capable of permitting tactic insertion. For example, in at least certain embodiments, a polymer made in accordance with the disclosure of WO 03/0404201 can qualify as a "propylene copolymer."

In one or more embodiments, the propylene copolymer has a Shore A hardness of less than about 90. In one or more embodiments, the propylene copolymer a Shore A hardness of about 45 to about 90. In one or more embodiments, the propylene copolymer has a Shore A hardness of about 55 to about 80.

In one or more embodiments, the propylene copolymer can have a molecular weight distribution (MWD) $M_w/M_n$ ranging from 1.5 to 40; or from 2 to 20; or from 2 to 10; or from 2 to 5. In one or more embodiments, the propylene copolymer can have a number average molecular weight of from 10,000 to 5,000,000; or from 40,000 to 300,000; or from 80,000 to 200,000, as determined by gel permeation chromatography (GPC). In one or more embodiments, the propylene copolymer can have a weight average molecular weight ($M_w$) within the range having an upper limit of 5,000,000 g/mol, or 1,000,000 g/mol, or 500,000 g/mol, and a lower limit of 10,000 g/mol, or 15,000 g/mol, or 20,000 g/mol, or 80,000 g/mol. Further, the propylene copolymer can have a Mooney viscosity (ML (1+4)@125° C.) from a low of 50, or 60, or 75, to a high of 80, or 90, or 100. Vistamaxx® is an illustrative propylene copolymer product, and is commercially available from Exxon Mobil Chemical Company.

Process Description

Any process for making TPVs can be employed. For example, the individual materials and components, such as the one or more rubber components, polyolefinic thermoplastic resin components, thermoplastic modifiers, mineral fillers, curing agents, additive oils, and other additives, can be mixed at a temperature above the melting temperature of the thermoplastic components to form a melt. Illustrative mixing equipment include: extruders with kneaders or mixing elements with one or more mixing tips or flights, extruders with one or more screws, and extruders of co or counter rotating type. Suitable mixing equipment also include Brabender™ mixers, Banbury™ mixers, Buss mixers and kneaders, and Farrell Continuous mixers, for example. One or more of those mixing equipment, including extruders, can be used in series.

The one or more polyolefinic thermoplastic resin components, thermoplastic modifiers, rubber components, and curing agents can be added to a heated mixer as individual feed streams, as a tumbled blend, or as a masterbatch. The one or more polyolefinic thermoplastic resin components can be added before cure, after cure, or divided in any proportions between before cure and after cure. Similarly, the one or more thermoplastic modifiers including the one or more propylene copolymers can be added before cure, after cure, or divided in any proportions between before cure and after cure. The additive oil, e.g. process oil, can be added during mastication, before cure, after cure, or divided in any proportions between before cure and after cure.

Preferably, the one or more curing agents are incorporated into the melt within a target range of melt temperature over a specified period of time (<120 seconds). The one or more curing agents can be added using any suitable technique, such as by injection as a solution in a compatible process oil, as a neat solid, as a neat melt, or as a masterbatch, for example. In the event a peroxide curative is used, the rubber components, peroxide curatives and enough of the one or more thermoplastic resin components to provide the plastic matrix, in which the rubber disperses, are blended to form the melt. Once the desired cure level is achieved, the remainder of the one or more thermoplastic resin components is added in any proportions to avoid any unintended break down or crosslinking of the one or more thermoplastic resin components. A side feeder for a single screw or twin screw extruder can be used to add the remaining portions of the thermoplastic resin components. In which case, the side feeder is preferably positioned after (downstream) the desired level of cure is obtained within the extruder.

The one or more mineral fillers and other additives can be introduced to the melt before, during or after cure. The additives, fillers or other compounds, which can interfere with the curing agents, should be added after curing reaches the desired level. Preferably, the one or more mineral fillers and other additives are added to the melt as a slurry or paste in a compatible rubber process oil. Powder blends or masterbatches of these components can be prepared in a wax or polymer carrier to facilitate metering and mixing. A side feeder can also be used to add the one or more mineral fillers and other additives as described above.

The required mixing for discrete rubber phase morphology and properties can be developed through choice of screw design and screw speed. It is convenient to follow the progression of vulcanization (crosslinking) by monitoring melt temperature or mixing energy or mixing torque requirements during mixing. The mixing torque or mixing energy curve generally goes through a maximum after which the mixing can be continued to achieve the desirable cure level (state) and improve the fabricability for the blend. Following the cure and sufficient mixing of the melt, the melt blend can be processed to form an elastomeric structure using any one or more of the following techniques: milling, chopping, extrusion, pelletizing, injection molding, or any other desirable technique. Additional details for making a TPV is described in U.S. Pat. No. 4,594,390.

Specific Embodiments

Various specific embodiments are described below, at least some of which are also recited in the claims. For example, at least one specific embodiment is directed to a high strength thermoplastic vulcanizate (TPV) composition that includes one or more propylene copolymers, one or more rubber components, and one or more mineral fillers. In one or more embodiments, at least one specific embodiment is directed to a high strength thermoplastic vulcanizate (TPV) composition that includes one or more propylene copolymers, one or more polyolefinic thermoplastic resin components, one or more rubber components, and one or more mineral fillers. In one or more embodiments, at least one specific embodiment is directed to an article that includes a roofing material prepared from the thermoplastic vulcanizate composition. In one or more embodiments, at least one specific embodiment is directed to an article that includes a sound deadening material prepared from the thermoplastic vulcanizate composition.

In one or more embodiments, the propylene copolymer has 60 wt % or more units derived from propylene; includes isotactically arranged propylene derived sequences; and has a heat of fusion less than 45 J/g. In one or more embodiments above or elsewhere herein, the propylene copolymer is present in the amount of 5 wt % or more, 10 wt % or more, 20 wt % or more, 30 wt % or more, or 40 wt % or more based on total weight of the thermoplastic vulcanizate composition. In one or more embodiments above or elsewhere herein, the propylene copolymer is present in the amount of 50 wt % or more based on total weight of the thermoplastic vulcanizate composition. In one or more embodiments above or elsewhere herein, the propylene copolymer is present in the amount ranging from a low of 5 wt %, 10 wt %, 15 wt %, or 20 wt % to a high of 35 wt %, 45 wt %, 50 wt %, or 60 wt %, based on total weight of the thermoplastic vulcanizate composition.

In one or more embodiments above or elsewhere herein, the propylene copolymer is a propylene/ethylene copolymer having an ethylene content of 5 wt % or more, 10 wt % or more, 15 wt % or more, 20 wt % or more, or 30 wt % or more, based on total weight of the propylene copolymer. In one or more embodiments above or elsewhere herein, the propylene copolymer is a propylene/ethylene copolymer having an ethylene content of from 5 wt % to 30 wt % based on total weight of the propylene copolymer. In one or more embodiments above or elsewhere herein, the propylene copolymer is a propylene/ethylene copolymer having an ethylene content of from 5 wt % to 20 wt % based on total weight of the propylene copolymer. In one or more embodiments above or elsewhere herein, the propylene copolymer is a propylene/ethylene copolymer having an ethylene content of from 5 wt % to 10 wt % based on total weight of the propylene copolymer.

In one or more embodiments above or elsewhere herein, the thermoplastic vulcanizate composition includes of from 1 wt % to 30 wt % of the polyolefinic thermoplastic resin component, based on total weight of the TPV composition. In one or more embodiments above or elsewhere herein, the thermoplastic vulcanizate composition includes of from 2 wt % to 20 wt % of the thermoplastic resin component, based on total weight of the TPV composition. In one or more embodiments above or elsewhere herein, the thermoplastic vulcanizate composition includes of from 2 wt % to 10 wt % of the polyolefinic thermoplastic resin component, based on total weight of the TPV composition. In one or more embodiments above or elsewhere herein, the thermoplastic vulcanizate composition includes of from 5 wt % to 10 wt % of the polyolefinic thermoplastic resin component, based on total weight of the TPV composition. In one or more embodiments above or elsewhere herein, the presence of the polyolefinic thermoplastic resin component ranges from a low of 1 wt %, or 2 wt % to a high of 8 wt %, 9 wt %, or 10 wt %, based on total weight of the TPV composition.

In one or more embodiments above or elsewhere herein, the polyolefinic thermoplastic resin component includes a polypropylene homopolymer, isotactic polypropylene, an impact copolymer comprising polypropylene, or blends thereof. In one or more embodiments above or elsewhere herein, the polyolefinic thermoplastic resin component has a heat of fusion greater that 45 J/g. In one or more embodiments above or elsewhere herein, the polyolefinic thermoplastic resin component includes polypropylene having a heat of fusion greater that 45 J/g.

In one or more embodiments above or elsewhere herein, the rubber component is at least partially vulcanized. In one or more embodiments above or elsewhere herein, the rubber component includes one or more thermoset rubbers. In one or more embodiments above or elsewhere herein, the rubber component is present in an amount of from 10 wt % to 40 wt % based on total weight of the thermoplastic vulcanizate composition. In one or more embodiments above or elsewhere herein, the rubber component is present in an amount of from 15 wt % to 35 wt % based on total weight of the thermoplastic vulcanizate composition. In one or more embodiments above or elsewhere herein, the rubber component is present in an amount of from 20 wt % to 40 wt % based on total weight of the thermoplastic vulcanizate composition. In one or more embodiments above or elsewhere herein, the presence of the rubber component ranges from a low of 10 wt %, 15 wt %, or 20 wt % to a high of 30 wt %, 35 wt %, or 40 wt %, based on total weight of the thermoplastic vulcanizate composition.

In one or more embodiments above or elsewhere herein, the mineral filler is present in the amount of 20 wt % to 70 wt %, or 30 wt % to 70 wt %, or 40 wt % to 70 wt % based on total of the thermoplastic vulcanizate composition. In one or more embodiments above or elsewhere herein, the mineral filler is present in the amount of based on total of the thermoplastic vulcanizate composition. In one or more embodiments above or elsewhere herein, the presence of the mineral filler ranges from a low of 30 wt %, 40 wt %, or 50 wt % to a high of 60 wt %, 65 wt %, or 70 wt %, based on total of the thermoplastic vulcanizate composition.

In one or more embodiments above or elsewhere herein, the mineral filler is halogen free. In one or more embodiments above or elsewhere herein, the mineral filler is selected from the group consisting of magnesium dihydroxide, aluminum trihydroxide, antimony trioxide, and combinations thereof. In one or more embodiments above or elsewhere herein, the mineral filler is magnesium hydroxide. In one or more embodiments above or elsewhere herein, the mineral filler is selected from the group consisting of talc, carbon black, graphite, calcium carbonate, flyash, cement dust, clay, feldspar, nepheline, silica or glass, fumed silica, alumina, magnesium oxide, zinc oxide, barium sulfate, aluminum silicate, calcium silicate, titanium dioxide, titanates, glass microspheres, chalk, and combinations thereof.

Articles

The high strength TPV compositions described are useful for making articles by extrusion, injection molding, blow molding, calendaring and compression molding techniques. Particularly, the high strength TPV compositions are useful for making a variety of articles for electrical, construction, automotive, and consumer applications. Some specific articles include, but are not limited to, electric cables, electric wires, flooring, tubing, hoses, belts, gaskets, moldings, molded parts, roofing materials, sound-deadening sheets, sound insulating materials, electrical insulating materials, and thermal insulating materials, for example. Another specific article includes an electrically conducting member, such as a fuel cell, for example. Such fuel cells are shown and described in Canadian Patent Application No. 2,317,059 A1, which is incorporated by reference in that regard.

In one or more embodiments, the high strength thermoplastic vulcanizate composition can be adhered to a second component or substrate to form a composite structure. Preferably, the second component is an elastomeric structure. The second component can be another thermoplastic elastomer or thermoplastic vulcanizate. The second component can also include a thermoset rubber, thermoplastic, or thermoplastic rubber. Illustrative composite structures include, but are not limited to, molded corners, molded end caps, glass run channels, trunk seals, tailgate seals, cowl seals, gap fillers, glass encapsulation, cut line seals, door seals, hood-to-radiator seals, windshield seals, sunroof seals, roof line seals, rear window seals, rocker panels, sashes, and belt-line seals.

EXAMPLES

The following examples illustrate high strength thermoplastic vulcanizate compositions that are highly loaded with one or more halogen free, flame retardant fillers. Surprisingly, those highly loaded thermoplastic vulcanizate compositions retained both the elasticity of the rubber phase and the processability of the plastic phase despite the addition of such large quantities of flame retardant filler. Comparison examples are provided to illustrate this unexpected and surprising finding that the percentage of flame retardant filler in Examples 1-6 had no detrimental effect on the physical properties of the thermoplastic vulcanizate compositions having the propylene copolymers. Instead, the tensile strength and percent elongation of the thermoplastic vulcanizate compositions (Examples 1-6) having 40 wt % to 50 wt % of the halogen free, flame retardant filler and at least 5 wt % of the propylene copolymers, surprisingly increased by about 10% compared to a similar thermoplastic vulcanizate composition not having the propylene copolymer. Table 1 shows the formulations of the Comparative Examples 1-5 and the Examples 1-6.

For purposes of convenience, various specific test procedures are identified in Table 2 for determining properties such as tensile strength, percent elongation at break, Shore A Hardness, Shore D Hardness, 100% Modulus, 200% Modulus, and 300% Modulus, and tear strength. However, when a person of ordinary skill reads this patent and wishes to determine whether a composition or polymer has a particular property identified in a claim, then any published or well-recognized method or test procedure can be followed to determine that property, although the specifically identified procedure is preferred. Each claim should be construed to cover the results of any of such procedures, even to the extent different procedures can yield different results or measurements. Thus, a person of ordinary skill in the art is to expect experimental variations in measured properties that are reflected in the claims. All numerical values can be considered to be "about" or "approximately" the stated value, in view of the nature of testing in general.

Each of the Examples 1-6 and Comparative Examples 1-5 was prepared in a 1.1 Liter Banbury™ mixer according to the formulations of Table 1. The rubber components and the thermoplastic resin components including the propylene copolymer, were added to the mixer and mixed at a temperature of from 180° C. to about 200° C. for 2 minutes at 150 RPM.

The additive oils, curing agents, fillers, and other additives were added to the melt and mixed for another 3 minutes before dumping the melt. A sheet was made out of the melt on a calendar followed by granulation. The granulates were injection molded to produce plaques of 150 mm long, 100 mm wide, and 2 mm thick. Dumbbells were cut from the injection molded plaques and tested according to the test procedures of Table 2. Those test results are shown in Tables 3-5.

TABLE 1

Formulations in weight percent.

| | Comp. Ex. 1 | Ex. 1 | Comp. Ex. 2 | Ex. 2 | Comp. Ex. 3 | Ex. 3 |
|---|---|---|---|---|---|---|
| S201-64 | 30.75 | — | 35.75 | — | 33.75 | — |
| KWDA 372 | — | 30.75 | — | 35.75 | — | 33.75 |
| HiFax CA10A | 23.00 | 23.00 | 18.00 | 18.00 | 15.00 | 15.00 |
| Magnifin H5GV | 40.00 | 40.00 | 40.00 | 40.00 | 45.00 | 45.00 |
| TiO2 | 2.75 | 2.75 | 2.75 | 2.75 | 2.75 | 2.75 |
| PP4045 | 0.10 | 0.10 | 0.10 | 0.10 | 0.10 | 0.10 |
| Tinuvin 327 | 0.40 | 0.40 | 0.40 | 0.40 | 0.40 | 0.40 |
| Irganox 1010 | 0.20 | 0.20 | 0.20 | 0.20 | 0.20 | 0.20 |
| Fusabond 353D | 2.00 | 2.00 | 2.00 | 2.00 | 2.00 | 2.00 |
| Irganox PS800FL | 0.30 | 0.30 | 0.30 | 0.30 | 0.30 | 0.30 |
| Tinuvin 770 DF | 0.50 | 0.50 | 0.50 | 0.50 | 0.50 | 0.50 |

| | Comp. Ex. 4 | Ex. 4 | Comp. Ex. 5 | Ex. 5 | Ex. 6 |
|---|---|---|---|---|---|
| S201-64 | 30.75 | 30.75 | 28.75 | 28.75 | 28.75 |
| Propylene copolymer A | — | 18 | — | 15 | — |
| Propylene copolymer B | — | — | — | — | 15 |
| HiFax CA10A | 18.00 | — | 15.00 | — | — |
| Magnifin H5GV | 45.00 | 45.00 | 50.00 | 50.00 | 50.00 |
| TiO2 | 2.75 | 2.75 | 2.75 | 2.75 | 2.75 |
| PP4045 | 0.10 | 0.10 | 0.10 | 0.10 | 0.10 |
| Tinuvin 327 | 0.40 | 0.40 | 0.40 | 0.40 | 0.40 |

TABLE 1-continued

Formulations in weight percent.

| Irganox 1010 | 0.20 | 0.20 | 0.20 | 0.20 | 0.20 |
|---|---|---|---|---|---|
| Fusabond 353D | 2.00 | 2.00 | 2.00 | 2.00 | 2.00 |
| Irganox PS800FL | 0.30 | 0.30 | 0.30 | 0.30 | 0.30 |
| Tinuvin 770 DF | 0.50 | 0.50 | 0.50 | 0.50 | 0.50 |

S201-64 is a thermoplastic vulcanizate having a Shore A Hardness (ASTM D 2240) of 64, tensile strength at break (ASTM D 412) of 7 MPa, elongation at break (ASTM D 412) of 450%, and density (ASTM D 792) of 0.97 g/cm$^3$. S201-64 is commercially available from Advanced Elastomer Systems, LP.

Propylene copolymer A is a metallocene catalyzed polypropylene/polyethylene copolymer having 11 wt % of ethylene. The melting point was less than 100° C. The Mooney viscosity (ML (1+4) at 125° C.) was 22 as measured according to ASTM D 1646.

Propylene copolymer B is a metallocene catalyzed polypropylene/polyethylene copolymer having 16 wt % of ethylene. The melting point was less than 100° C. The Mooney viscosity (ML (1+4) at 125° C.) was 25 as measured according to ASTM D 1646.

Propylene copolymers A and B were each prepared in a 1 liter internal volume Continuous Flow Stirred Tank Reactor. Hexane was used as the solvent. The liquid full reactor had a variable residence time of approximately 9 to 15 minutes and the pressure was maintained at 700 kPa. A mixed feed of hexane, ethylene and propylene was pre-chilled to approximately −30° C. to remove the heat of polymerization before entering the reactor. The solution of catalyst/activator in toluene and the scavenger in hexane were separately and continuously added to the reactor to initiate the polymerization. The reactor temperature was maintained around 70° C.

Hexane at 3.56 kg/hr was premixed with both ethylene at rate 60 g/hr and propylene at rate 812 g/hr and fed to the reactor. The polymerization catalyst, dimethyl silyl bridged bis-indenyl hafnium dimethyl, was activated in situ in 1:1 molar ratio with N,N'-Dimethyl anilinium-tetrakis (heptafluoro-1-napthyl)borate and introduced into the polymerization reactor at the rate of 0.0135 g/hr. A dilute solution of triisobutyl aluminum was introduced into the reactor as a scavenger for catalyst terminators. A rate of approximately 1.11 mole of scavenger per mole of catalyst was adequate for this polymerization. After five residence times of steady polymerization, a representative sample of the copolymer produced in this polymerization was collected. The solution of the copolymer was withdrawn from the top, and then steam distilled to isolate the copolymer. The polymerization rate was measured to be about 0.26 kg/hr. The copolymer produced in this polymerization was analyzed for ethylene content by FTIR. The molecular weight averages were measured by GPC. Crystallinity was measured by DSC and the amount of mm triads of propylene residues in the copolymer chain was determined by 13 C NMR.

KWDA 372 is a blend of a thermoplastic vulcanizate and 16.98 wt % of propylene copolymer A based on total weight of the blend. The KWDA 372 blend included 50.9 wt % Vistalon™ 3666 rubber, 11.93 wt % process oil (SUNPAR 150); 2.33 wt % phenolic resin (SP 1045); 0.36 wt % SnCl$_2$; 0.60 wt % ZnO; 2.9 wt % carbon black; 3.52 calcinated clay and 10.48 wt % homo polypropylene. The Vistalon™ 3666 rubber is available from ExxonMobil Chemical Company. The SUNPAR 150 is available from Sunoco, Inc. The phenolic resin (SP 1045) was purchased from Schenectady International Group, Inc. The homo polypropylene was 51S07A available from Equistar.

HiFax® CA 10A is a thermoplastic olefin polymer available from Bassell Polyolefin.

Magnifin® H5GV is 99.8% magnesium dihydroxide (halogen free, flame retardant) and available from MAGNIFIN Magnesiaprodukte GmbH & Co KG.

$TiO_2$ is titanium oxide.

PP4045 is a carbon black master batch in polypropylene resin containing 40 wt % carbon black, and was obtained from Cabot Plastic.

Tinuvin® 327 is a UV absorber from Ciba Specialty Chemicals.

770DF is a Hindered amine (HALS) UV stabilizer from Ciba Specialty Chemicals.

Irganox® 1010 and PS800FL are antioxidants available from Ciba Specialty Chemicals.

Fusabond® 353D is a chemically modified polypropylene and serves as a coupling agent for the flame retardant mineral material. Fusabond® resins are available from DuPont Corp.

TABLE 2

Test Procedures.

| TEST: | TEST PROCEDURE: |
|---|---|
| Shore A Hardness | ISO 868-85 |
| Shore D Hardness | ISO 868-85 |
| Tensile Strength, MPa | ISO 37-1, Type S2 |
| 100% Modulus, MPa | ISO 37-1 |
| 200% Modulus, MPa | ISO 37-1 |
| 300% Modulus, MPa | ISO 37-1 |
| Elongation at break, % | ISO 37-1 |
| Tear Strength, kN/m | ISO 34 B, b |

TABLE 3

Hardness Test Results.

| | Shore A Hardness | Shore D Hardness |
|---|---|---|
| Comp. Ex. 1 | 93 | 34 |
| Ex. 1 | 92 | 33 |
| Comp. Ex. 2 | 93 | 32 |
| Ex. 2 | 92 | 33 |
| Comp. Ex. 3 | 94 | 35 |
| Ex. 3 | 92 | 33 |
| Comp. Ex. 4 | 94 | 36 |
| Ex. 4 | 93 | 35 |
| Comp. Ex. 5 | 95 | 38 |
| Ex. 5 | 94 | 37 |
| Ex. 6 | 94 | 37 |

TABLE 4

Properties measured perpendicular to flow direction.

| | Comp. Ex. 1 | Ex. 1 | Comp. Ex. 2 | Ex. 2 | Comp. Ex. 3 | Ex. 3 |
|---|---|---|---|---|---|---|
| 100% Mod | 6.4 | 6.4 | 6.2 | 6.0 | 6.1 | 5.9 |
| 200% Mod | 7.2 | 7.3 | 7.0 | 7.1 | 6.9 | 6.7 |
| 300% Mod | 8.1 | 8.3 | 7.9 | 8.3 | 7.7 | 7.9 |
| Elongation | 456 | 527 | 394 | 473 | 339 | 417 |
| Tensile | 9.4 | 10.5 | 8.6 | 10.4 | 7.9 | 8.9 |
| Tear Strength | 41 | 42 | 38 | 42 | 37 | 39 |

TABLE 4-continued

Properties measured perpendicular to flow direction.

| | Comp. Ex. 4 | Ex. 4 | Comp. Ex. 5 | Ex. 5 | Ex. 6 |
|---|---|---|---|---|---|
| 100% Mod | 6.3 | 6.6 | 6.0 | 6.6 | 6.5 |
| 200% Mod | 6.9 | 7.8 | 6.5 | 7.4 | 7.2 |
| 300% Mod | 7.7 | 8.7 | 7.2 | 8.1 | 8.0 |
| Elongation | 407 | 411 | 365 | 417 | 386 |
| Tensile | 8.5 | 9.5 | 7.6 | 8.9 | 8.4 |
| Tear Strength | 40 | 42 | 38 | 39 | 38 |

TABLE 5

Properties measured parallel to flow direction.

| | Comp. Ex. 1 | Ex. 1 | Comp. Ex. 2 | Ex. 2 | Comp. Ex. 3 | Ex. 3 |
|---|---|---|---|---|---|---|
| 100% Mod | 8.3 | 7.9 | 7.9 | 7.7 | 7.7 | 7.5 |
| 200% Mod | 9.1 | 8.9 | 8.7 | 8.8 | 8.4 | 8.3 |
| 300% Mod | — | 9.9 | — | 9.9 | — | 9.2 |
| Elongation | 260 | 334 | 236 | 324 | 238 | 309 |
| Tensile | 9.0 | 10.0 | 8.6 | 10.0 | 8.3 | 9.1 |
| Tear Strength | 49 | 50 | 44 | 47 | 44 | 43 |

| | Comp. Ex. 4 | Ex. 4 | Comp. Ex. 5 | Ex. 5 | Ex. 6 |
|---|---|---|---|---|---|
| 100% Mod | 8.6 | 8.8 | 8.2 | 9.0 | 8.6 |
| 200% Mod | 9.0 | 9.9 | — | 9.8 | 9.3 |
| 300% Mod | — | 10.6 | — | — | — |
| Elongation | 204 | 315 | 191 | 272 | 266 |
| Tensile | 8.5 | 10.4 | 8.1 | 9.9 | 9.3 |
| Tear Strength | 50 | 50 | 49 | 48 | 46 |

Each of the inventions have been described in greater detail above, including specific embodiments, versions and examples, but the inventions are not limited to these embodiments, versions or examples, which are included to enable a person having ordinary skill in the art to make and use the inventions, when the information in this patent is combined with available information and technology. Various terms as used herein have also been defined. To the extent a term used in a claim is not defined above, it should be given the broadest definition persons in the pertinent art have given that term as reflected in one or more printed publications or issued patents.

Certain composition features have been described using a set of numerical upper limits and a set of numerical lower limits. It should be appreciated that ranges from any lower limit to any upper limit are contemplated unless otherwise indicated. Certain lower limits, upper limits and ranges appear in one or more claims. All numerical values are "about" or "approximately" the indicated value, and take into account experimental error and variations that would be expected by a person having ordinary skill in the art. Furthermore, all patents, test procedures, and other documents cited in this application are fully incorporated by reference to the extent such disclosure is not inconsistent with this application and for all jurisdictions in which such incorporation is permitted.

What is claimed is:

1. A high strength thermoplastic vulcanizate composition consisting of:
   (a) an at least partially-cured ethylene-propylene-diene rubber, and an elastomeric propylene copolymer, wherein the elastomeric propylene copolymer has 60 wt % or more units derived from propylene, includes isotactically arranged propylene derived sequences, and has a heat of fusion of less than 45 J/g;

(b) a polypropylene having a heat of fusion greater than 45 J/g;
(c) a thermoplastic modifier functionalized having from 0.2 to 5 wt % polar moieties;
(d) 20 wt % to 70 wt % of a filler selected from the group consisting of aluminum trihydroxide, magnesium dihydroxide, antimony trioxide, and combinations thereof; and
(e) an additive oil in an amount of from 5 to 300 parts by weight rubber; and less than 1.0 wt % by weight of the composition of carbon black;
with the proviso that the thermoplastic vulcanizate includes 10 to 40 wt. % of the ethylene-propylene-diene rubber, 10 to 35 wt. % of the elastomeric propylene copolymer, 2 to 20 wt. % of the polypropylene, and
wherein the high strength thermoplastic vulcanizate composition has a Shore A hardness of 90 or more and a 100% Modulus measured parallel to the flow direction of at least 7.5 MPa and a 100% Modulus measured perpendicular to the flow direction of at least 6.0 MPa.

2. The composition of claim 1, wherein the tensile strength measured perpendicular to the flow direction is from 9.3% to 16.5% greater than that of the thermoplastic vulcanizate composition absent the propylene copolymer.

3. The composition of claim 1, wherein the propylene copolymer is present in the amount of 15 wt % or more based on total weight of the thermoplastic vulcanizate composition.

4. The composition of claim 1, wherein the tensile strength measured parallel to the flow direction is from 9.6% to 22.4% greater than that of the thermoplastic vulcanizate composition absent the propylene copolymer.

5. The composition of claim 1, wherein the percent elongation measured perpendicular to the flow direction is from 1.0% to 23.0% greater than that of the thermoplastic vulcanizate composition absent the propylene copolymer.

6. The composition of claim 1, wherein the percent elongation measured parallel to the flow direction is from 28.5% to 54.4% greater than that of the thermoplastic vulcanizate composition absent the propylene copolymer.

7. The high strength thermoplastic vulcanizate composition of claim 1, wherein the high strength thermoplastic vulcanizate composition has a tensile strength of 9.5 MPa or greater, as measured according to ISO 37-1, Type S2.

8. The high strength thermoplastic vulcanizate composition of claim 7, wherein the tensile strength is measured perpendicular to flow.

9. The high strength thermoplastic vulcanizate composition of claim 1, wherein the high strength thermoplastic vulcanizate composition has an elongation break of 272% or higher measured parallel to flow direction.

10. The high strength thermoplastic vulcanizate composition of claim 1, wherein the high strength thermoplastic vulcanizate composition has a tensile strength of at least 9 MPa, as measured according to ISO 37-1, Type S2.

11. The composition of claim 1, wherein the thermoplastic modifier is present in the amount of up to 2 weight percent based on the weight of the polymer content of the thermoplastic vulcanizate.

12. The composition of claim 1, where the thermoplastic modifier is maleated polypropylene and where the thermoplastic vulcanizate includes 2 wt. % maleated polypropylene, based on the total weight of thermoplastic vulcanizate.

13. The composition of claim 1, where the thermoplastic modifier is present in an amount up to 10 wt. % of the polymeric portion of the thermoplastic vulcanizate.

14. The composition of claim 1, where the thermoplastic vulcanizate has a Shore D hardness of 37 or less.

15. The composition of claim 14, where the thermoplastic vulcanizate has a Shore D hardness in range from 33 to 37.

16. The composition of claim 1, wherein the filler is present from 25 wt % to 70 wt % of the thermoplastic vulcanizate.

17. The composition of claim 1, wherein the filler is present from 30 wt % to 70 wt % of the thermoplastic vulcanizate.

* * * * *